United States Patent
Oshima

(10) Patent No.: US 8,593,652 B2
(45) Date of Patent: Nov. 26, 2013

(54) IMAGE READING DEVICE

(75) Inventor: Osamu Oshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/383,713

(22) PCT Filed: Jun. 21, 2010

(86) PCT No.: PCT/JP2010/060452
§ 371 (c)(1),
(2), (4) Date: Jan. 12, 2012

(87) PCT Pub. No.: WO2011/021434
PCT Pub. Date: Feb. 24, 2011

(65) Prior Publication Data
US 2012/0133963 A1    May 31, 2012

(30) Foreign Application Priority Data

Aug. 21, 2009 (JP) ................................ 2009-192488

(51) Int. Cl.
*G06K 15/00* (2006.01)
*B65H 83/00* (2006.01)
*B41J 3/00* (2006.01)
*G03G 15/00* (2006.01)

(52) U.S. Cl.
USPC .......... 358/1.12; 358/1.5; 358/514; 358/418; 271/3.19; 271/3.2; 347/4; 347/19; 399/371; 399/372

(58) Field of Classification Search
None
See application file for complete search history.

(56) References Cited

U.S. PATENT DOCUMENTS

| | | | | |
|---|---|---|---|---|
| 5,907,759 | A * | 5/1999 | Yashiro | 399/371 |
| 6,032,941 | A | 3/2000 | Endo | |
| 7,891,804 | B2 * | 2/2011 | Taguchi et al. | 347/104 |
| 7,924,474 | B2 * | 4/2011 | Itoh | 358/474 |
| 2008/0308995 | A1 * | 12/2008 | Tobinaga et al. | 271/8.1 |
| 2009/0102908 | A1 * | 4/2009 | Imoto | 347/104 |

FOREIGN PATENT DOCUMENTS

| | | | |
|---|---|---|---|
| JP | 8-286436 | A | 11/1996 |
| JP | 9-194073 | A | 7/1997 |
| JP | 9-216742 | A | 8/1997 |
| JP | 10-182019 | A | 7/1998 |
| JP | 2000-354130 | A | 12/2000 |
| JP | 2009-10861 | A | 1/2009 |

OTHER PUBLICATIONS

Official Communication issued in International Patent Application No. PCT/JP2010/060452, mailed on Aug. 3, 2010.

* cited by examiner

*Primary Examiner* — Steven Kau
(74) *Attorney, Agent, or Firm* — Keating & Bennett, LLP

(57) ABSTRACT

An image reader includes a path switching part, located at a branch point that switches between a double-sided path and a single-sided path. The double-sided path defines a conveyance route that passes through a reading position from the branch point to enter a conveyance path that causes a document to make a U-turn, and then again passes through the reading position to be discharged to a paper discharge tray. The single-sided path defines a conveyance route that, without passing through the reading position, merges into the conveyance path from the branch point. Along the double-sided path, document detecting sensors provide detection results so that a collision determination part determines a possibility of a collision between documents, and if such a possibility is determined, the path switching part switches the double-sided path to the single-sided path to prevent the documents from colliding head-on with each other in the vicinity of the reading position.

4 Claims, 9 Drawing Sheets

CONTINUOUS READING BASED ON A BATCH SYSTEM

IMAGE READING DEVICE

BACKGROUND OF THE INVENTION

1. Field of the Invention

The present invention relates to an image reader, and more particularly, to an improvement of an image reader including an automatic document conveying mechanism that automatically reads both sides of a document using only one image sensor.

2. Description of the Related Art

An image reader that can automatically convey two or more documents to sequentially read the documents is well known. Further, an image reader that can read both sides of a document on the basis of automatic conveyance is also well known. As a method used by the image reader that can read both sides of a document, a one-pass two-scanner method that uses two image sensors to read both sides of a document, or a two-pass one-scanner method that reverses a document during automatic conveyance to read both sides of the document with use of one image sensor is known.

As a system for image reading based on the two-pass one-scanner method, a switchback system that passes a document in the same direction twice with respect to an image sensor by performing switchback that switches a conveying direction during conveyance of the document, or a U-turn system that passes a document in opposite directions twice in total with respect to an image sensor by using a U-turn path to make a conveyance path intersect with itself is possible. In the case of using the U-turn system, it is not necessary to switch a conveying direction, so that conveyance control can be simplified, and also a reading time can be shortened (e.g., Japanese Published Unexamined Patent Application 2000-354130).

Also, in the case of an image reader that continuously reads two or more documents, before a preceding document is discharged from a conveyance path, a subsequent document is fed to the conveyance path, and thereby a reading time per document can be shortened. That is, if document conveyance control is performed such that two or more documents are simultaneously conveyed without overlapping with each other, the reading time per document can be further shortened.

However, in the case of simultaneously conveying two or more documents, documents may interfere with each other in the conveyance path due to conveyance delay of some of the documents. In particular, in the case of the image reader based on the U-turn system, the conveyance path is caused to intersect with itself, so that documents that are conveyed in mutually opposite directions may collide with each other at an intersection, and such a collision may significantly damage the documents.

In order to prevent such a collision, there is a known image reader that, in the case where conveyance delay of a preceding document is detected, stops or decelerates only an upstream side conveying roller to thereby prevent the preceding document from colliding with a subsequent document (e.g., Japanese Published Unexamined Patent Application 1996-286436). However, if conveying speed is rapidly changed, the document may be damaged. Also, there is a problem that, as described in Japanese Published Unexamined Patent Application 1996-286436, if only some of conveying rollers on a conveyance route are attempted to be decelerated or stopped, a mechanism and control for document conveyance become complicated.

SUMMARY OF THE INVENTION

In consideration of the above situations, preferred embodiments of the present invention have been developed and provide an image reader that, at the time of continuous reading of double sided documents, prevents documents from colliding with each other in a conveyance path. Also, preferred embodiments of the present invention provide an image reader that speeds up continuous reading of double-sided documents and also prevents documents from colliding with each other in a conveyance path. Further, preferred embodiments of the present invention provide an image reader that, without complicating a configuration for automatic conveyance, prevents documents from colliding with each other. In particular, preferred embodiments of the present invention provide an image reader that prevents documents currently conveyed in mutually opposite directions from colliding with each other at an intersection along a conveyance route that would significantly damage the documents.

An image reader according to a first preferred embodiment of the present invention includes a reading specifying device arranged to specify double-sided reading or single-sided reading; a route switching device arranged to, at a branch point between a first conveyance route for the double-sided reading and a second conveyance route for the single-sided reading, on the basis of the specified reading method, switch a document conveyance route; and a collision determination device arranged to determine a possibility of a collision between documents, wherein the first conveyance route includes a first introduction path that conveys the document from the branch point to a reading position; a U-turn path that makes the document perform a U-turn, the document having entered from the first introduction path and passed through the reading position, and makes the document enter the reading position again from a direction opposite to the first introduction path; and a discharge path that conveys the document to a paper discharge tray, the document having entered from the U-turn path and passed through the reading position, the second conveyance route includes a second introduction path that merges with the U-turn path without passing through the reading position, and upon the double-sided reading being specified, the route switching device switches the document conveyance route from the first conveyance route to the second conveyance route on the basis of a result of the determination by the collision determination device.

According to such a configuration, in the case of continuous reading of double-sided documents, if there is a possibility of a collision between documents, the conveyance route can be switched from the first conveyance route to the second conveyance route to change the conveyance route for a subsequent document. For this reason, in the vicinity of the reading position, documents that are respectively conveyed in opposite directions can be prevented from colliding with each other, and thereby the documents that are currently conveyed can be prevented from being significantly damaged by the collision. Note that the document conveyance route is switched to the second conveyance route, and thereby documents may interfere with each other in the U-turn path; however, these documents are conveyed in the same direction in the U-turn path, and therefore are not damaged.

An image reader according to a second preferred embodiment of the present invention preferably includes, in addition to the above configuration, a document detecting sensor that detects the document on the first conveyance route, wherein the collision determination device determines a possibility of a collision between documents on the basis of a result of the detection by the document detecting sensor.

According to such a configuration, a conveyance position of a document is detected by the document detecting sensor, and if conveyance delay of a preceding document is detected, the conveyance route for a subsequent document can be switched. For this reason, documents that are respectively conveyed in opposite directions can be prevented from colliding with each other due to the conveyance delay of the document.

An image reader according to a third preferred embodiment of the present invention preferably includes, in addition to the above configuration, first and second document detecting sensors arranged to detect the document on the first conveyance route, wherein when the document having passed through the first document detecting sensor does not pass through the second document detecting sensor within a subsequent predetermined time, the collision determination device determines that the documents may collide with each other.

According to such a configuration, if a preceding document does not pass through the second document detecting sensor within the predetermined time after passing through the first document detecting sensor, the collision determination device can determine that the preceding document may collide with a subsequent document. For this reason, on the basis of such a simple configuration, a collision between documents can be predicted.

An image reader according to a fourth preferred embodiment of the present invention preferably includes, in addition to the above configuration, a document detecting sensor that detects the document on the first conveyance route; and a conveying motor that conveys the document, wherein the collision determination device determines a possibility of a collision between documents on the basis of a result of the detection by the document detecting sensor and a rotation amount of the conveying motor.

According to such a configuration, on the basis of the rotation amount of the conveying motor, a position displacement of a preceding document is detected, and if the position displacement exceeds a predetermined amount, the collision determination device can determine that the preceding document may collide with a subsequent document. For this reason, a collision between documents can be accurately predicted.

The image reader according to various preferred embodiments of the present invention can prevent, at the time of continuous reading of double-sided documents, documents from colliding with each other in a conveyance path. Also, without complicating a configuration, documents can be prevented from colliding with each other. In particular, in the case where at an intersection on a conveyance route, an abnormality occurs, such as conveyance delay of a preceding document, by switching the conveyance route for a subsequent document, the documents currently conveyed in mutually opposite directions can be prevented from colliding with each other to prevent being significantly damaged.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
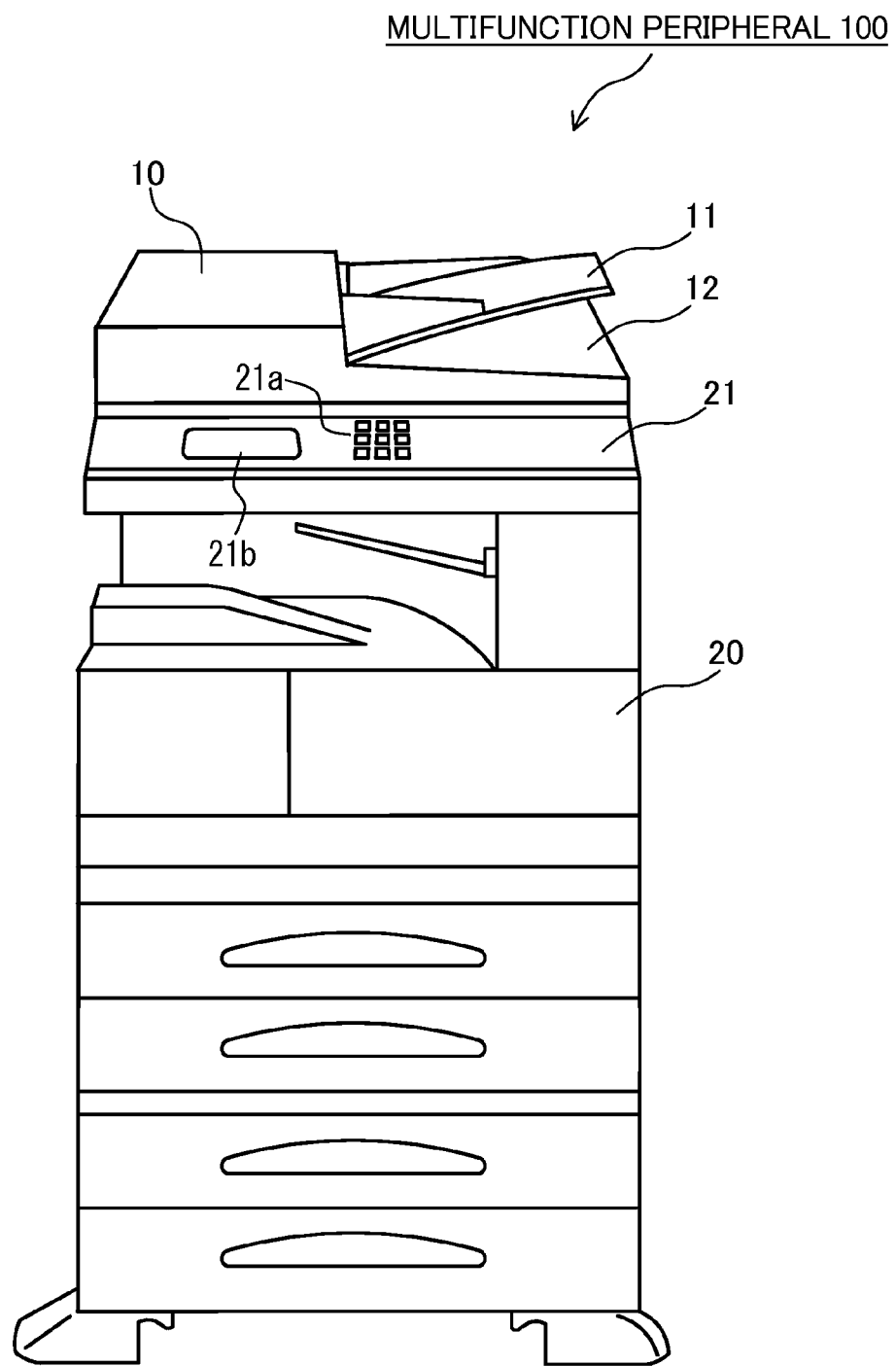
FIG. 1 is an appearance diagram illustrating one configuration example of an image reader according to a preferred embodiment of the present invention, in which as one example of the image reader, a multifunction peripheral 100 is illustrated.

FIG. 1 is an appearance diagram illustrating one configuration example of an image reader according to a preferred embodiment of the present invention, in which as one example of the image reader, a multifunction machine 100 is illustrated. The multifunction peripheral (MFP) 100 preferably includes an MFP main body part 20 that preferably performs image reading, printing, facsimile transmission/reception, and the like; and an ADF (Auto Document Feeder) device 10 that automatically conveys a document at the time of image reading.

An operation panel 21 of the MFP main body part 20 preferably includes an operation input part 21a including a start key, numeric keys, and the like for a user to provide operation input; and a liquid crystal display part 21b to provide display output of an operational state to the user. For example, the user can specify any of single-sided reading or double-sided reading of a document by providing operation input to the operation input part 21a. Also, if conveyance delay of a document or the like occurs, an error display is provided on the liquid crystal display part 21b.

Also, on an upper surface of the MFP main body part 20, an unillustrated contact glass is provided, and on the contact glass, the ADF device 10 is arranged to be openable and closable. That is, the multifunction peripheral 100 can read a document on the basis of any of a flat bed system that reads a document placed on the contact glass and an ADF system that reads a document currently automatically conveyed by the ADF device 10.

The ADF device 10 preferably includes a paper feed tray 11 and a paper discharge tray 12, inside which a conveyance path is provided. Documents on the paper feed tray 11 are fed while being separated one by one; conveyed along the conveyance path; and discharged to the paper discharge tray 12. The conveyance path is arranged so as to pass over the contact glass of the MFP main body part 20, and each of the documents is read by the MFP main body part 20 when passing over the contact glass.

Figure 2:
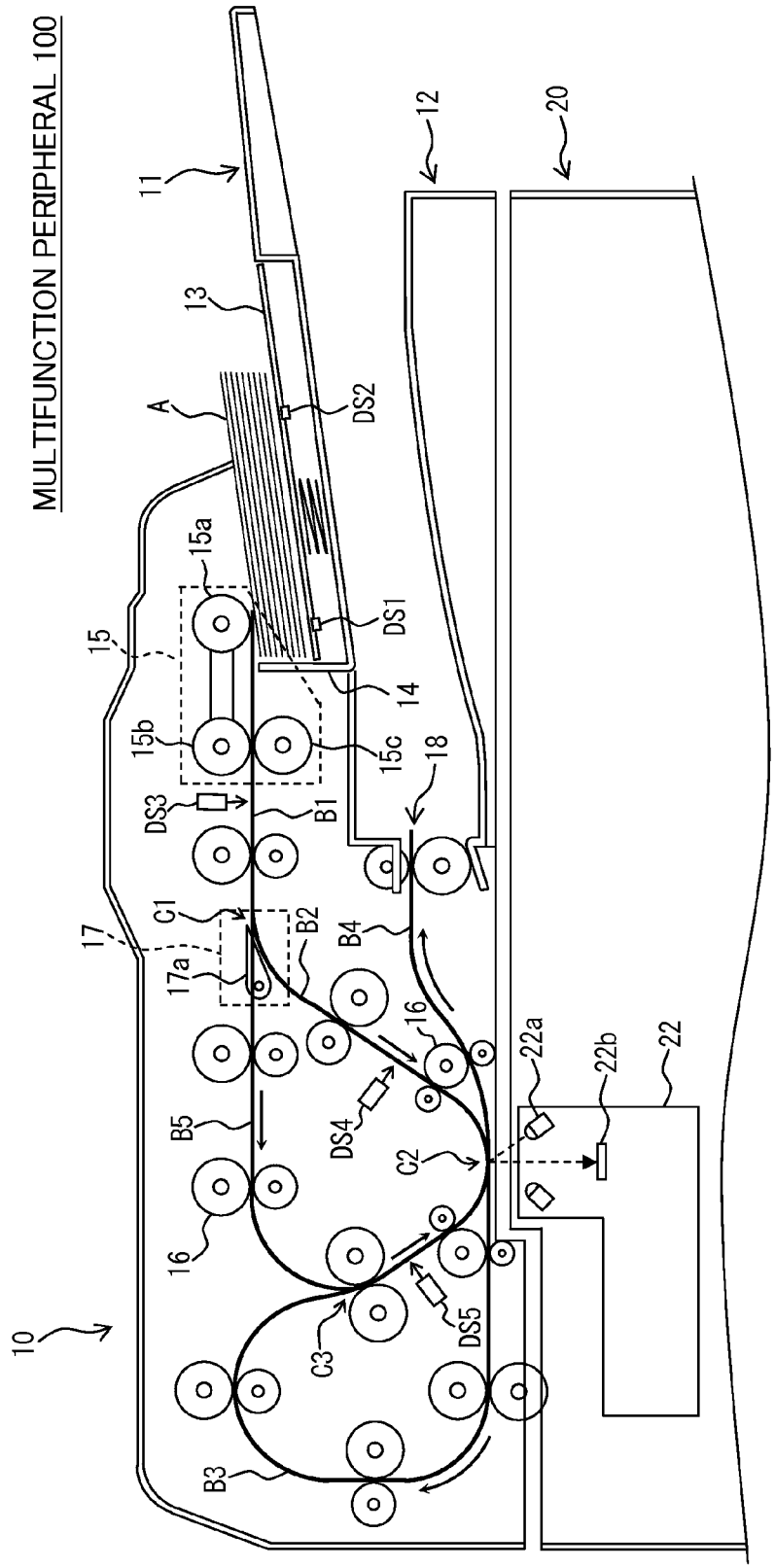
FIG. 2 is a cross-sectional view illustrating one configuration example of a main portion of the multifunction peripheral 100 in FIG. 1, in which mainly an internal structure of an ADF device 10 is schematically illustrated.
Figure 3:
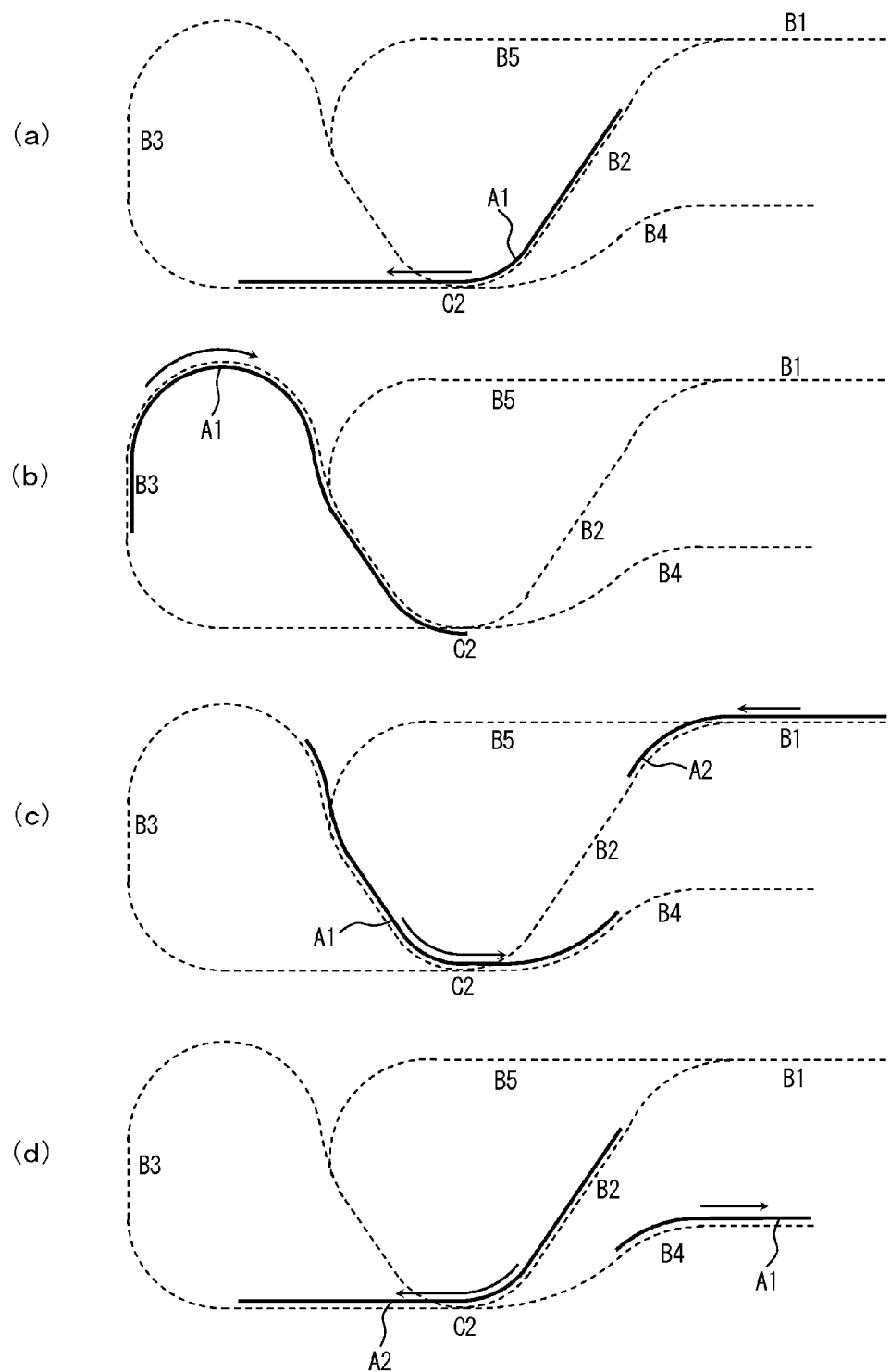
FIGS. 3A-3D are explanatory diagrams of continuous reading based on a sequential system.
Figure 4:
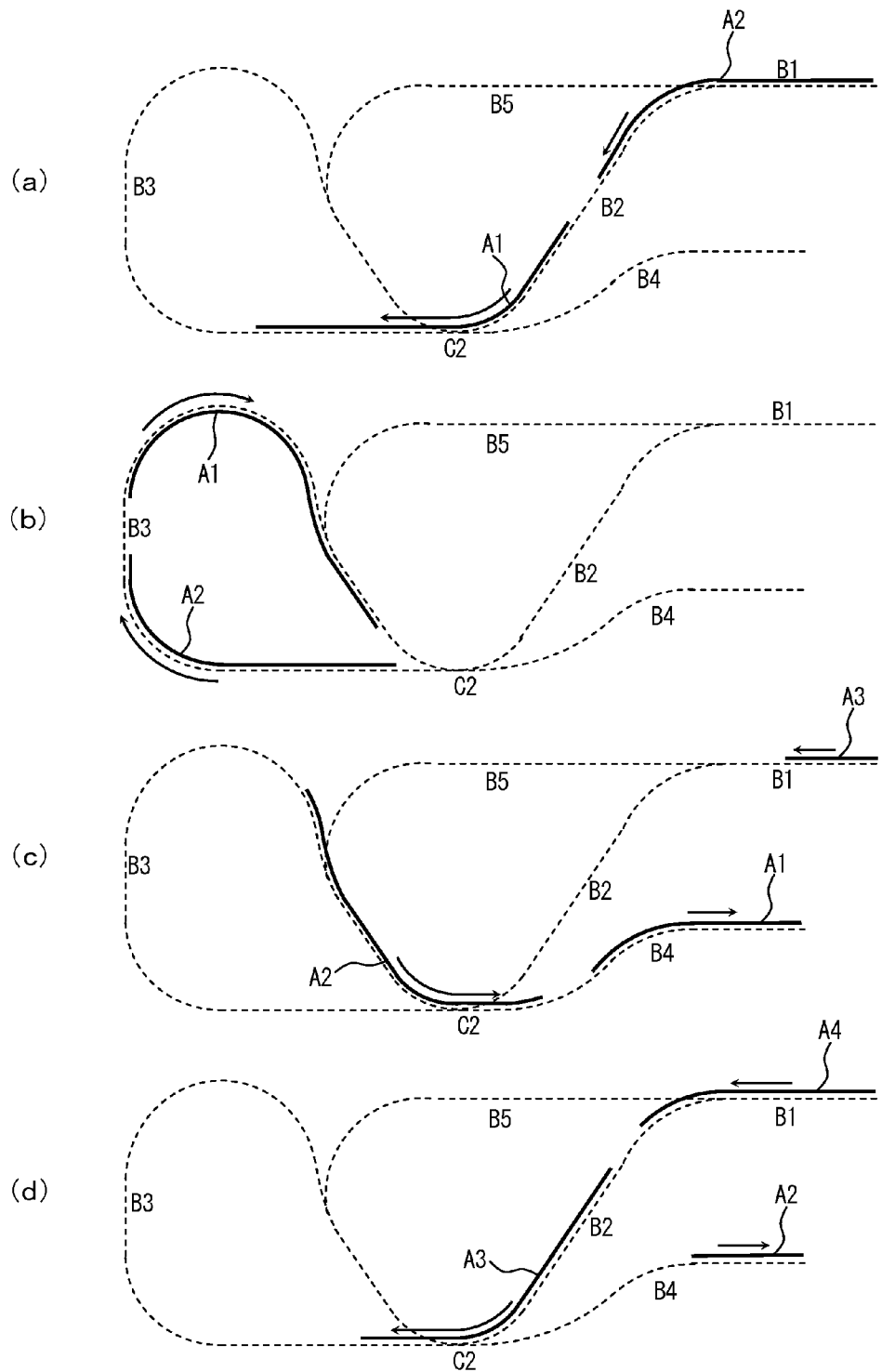
FIGS. 4A-4D are explanatory diagrams of continuous reading based on a batch system.

FIG. 2 is a cross-sectional view illustrating one configuration example of a main portion of the multifunction peripheral 100 in FIG. 1, in which mainly an internal structure of the ADF device 10 is schematically illustrated. B1 to B5 in the diagram indicate document conveyance paths, C1 is a branch point between the conveyance paths B2 and B5, C2 is a document reading position, and C3 is a merge point of the conveyance paths B3 and B5.

A scanner unit 22 is an image sensor that optically reads an image of a document A passing through the reading point C2, and includes a light projector 22a and a line sensor 22b. Irradiation light from the light projector 22a is reflected by the document A on the contact glass, and the reflected light is detected by the line sensor 22b in which a number of light receiving elements are linearly arranged. By relatively moving the document A and the line sensor 22b in a direction perpendicular or substantially perpendicular to a direction of the arrangement, the two-dimensional image can be read. In the case of image reading based on the ADF system, image reading of the document A currently conveyed is performed with the scanner unit 22 being kept still. Note that the scanner unit 22 can also be used as a document detecting sensor that detects arrival or passing of the document A with respect to the reading position C2.

The multifunction peripheral 100 preferably uses the two-pass one-scanner method, and uses the one scanner unit 22 to perform the double-sided reading of a document. The two-pass one-scanner method refers to a double-sided reading method that reverses a document to read the document twice with one and the same scanner unit 22. In a general image reader based on the two-pass one-scanner method, a document A is reversed by switching back the document; conveyed again just before the scanner unit 22 through another conveyance path; and caused to pass over the scanner unit 22 twice in total in the same direction.

On the other hand, in the multifunction peripheral 100, the document A is made to perform a U-turn to be thereby reversed, and then made to pass over the scanner unit 22 twice in total. In this case, a direction in which the document A passes over the scanner unit 22 is opposite between the first and second passes.

In the ADF device 10, the conveyance paths B1 to B5 are preferably provided, and a conveyance route for a document A is different between the single-sided reading and the double-sided reading. In the case of performing the double-sided reading, the document is conveyed in the order of the conveyance paths B1, B2, B3, and B4. This conveyance route is hereinafter referred to as a double-sided path. On the other hand, in the case of performing the single-sided reading, the document is conveyed in the order of the conveyance paths B1, B5, B3, and B4. This conveyance route is hereinafter referred to as a single-sided path.

The conveyance path B1 is a paper feed path that conveys the document A having been fed from the paper feed tray 11 to the branch point C1, and used for both of the single-sided reading and double sided reading.

The conveyance path B2 is an introduction path exclusive for double-sided reading, which conveys the document A for double-sided reading from the branch point C1 to the reading point C2, and without U-turning, conveys the document A to the reading position C2 almost linearly. The document that has entered from the conveyance path B2 and passed through the reading position C2 from right to left enters the conveyance path B3.

The conveyance path B3 is a U-turn path that makes the document for double-sided reading perform a U-turn to reverse the document. The document that has passed through the reading position C2 from right to left enters a lower side of the conveyance path B3; is conveyed clockwise to be brought into a reversed state; then returns to the reading position C2 from an upper side of the conveyance path B3; and passes through the reading position C2 from left to right. That is, by passing through the conveyance path B3, the document can be made to pass through the reading position C2 in the state where the document is reversed, twice in total. In this case, a direction in which the document passes through the reading position C2 is opposite between the first and second passes. Note that, in the conveyance path B3, a downstream side of the merge point C3 is also used for single-sided reading.

The conveyance path B4 is a discharge path that conveys the document having passed through the reading position C2 from left to right to a discharge port 18, and then discharges the document to the paper discharge tray 12, and is used for both of the single-sided reading and double-sided reading.

The conveyance path B5 is an introduction path exclusive for single-sided reading, which conveys the document A for single-sided reading from the branch position C1 to the merge position C3 in the conveyance path B3, and defines a laterally-facing U-shaped conveyance path together with the conveyance path B3. The document for single-sided reading that has entered the conveyance path B3 from the merge point C3 passes through the reading position C2 from left to the right, enters the conveyance path B4, and is discharged to the paper discharge tray 12 just as with the document for double-sided reading.

The paper feed tray 11 preferably includes a document stage 13 arranged to stack and place documents; and a document stopper 14 arranged to position the documents. The document stage 13 is biased upward by biasing member such as a spring to bring an uppermost document into contact with a pickup roller 15a. Also, regarding the documents on the document stage 13, fore ends (in the diagram, left ends) thereof in a feeding direction are positioned by the document stopper 14. For this reason, the uppermost document is in a state where the fore end thereof is positioned and a vicinity of the fore end is pressed against the pickup roller 15a.

A document feeding part 15 is a document feeder adapted to feed the documents A on the paper feed tray 11 to the conveyance path one by one, and preferably includes a pickup roller 15a, a separation roller 15b, and a retard roller 15c. The pickup roller 15a and separation roller 15b are rotationally driven in the document feeding direction, and the retard roller 15c is rotationally driven in a backward direction. For this reason, the documents A on the paper feed tray 11 are fed by the pickup roller 15a to the conveyance path B1 sequentially from the top, and among the documents A that have been fed in a multiple feeding state, only the uppermost document A is separated by the separation roller 15b and retard roller 15c that rotates in directions opposite to each other, and then conveyed in the feeding direction.

A conveying roller 16 preferably includes a driving roller that is rotationally driven; and a driven roller that is arranged to face the driving roller and sandwich the conveyance path. In the conveyance paths B1 to B5, a number of conveying rollers 16 are arranged at intervals shorter than a shortest document length, and a document A is conveyed on the conveyance paths by these conveying rollers 16. Note that the conveying rollers 16 are rotationally driven by unillustrated conveying motors 36; however, in order to drive some of the conveying motors 36 asynchronously with the rest of the conveying motors 36, a dedicated clutch and the like are required, which complicates a configuration to increase cost. For this reason, in the present preferred embodiment, it is assumed that all of the conveying rollers 16 are driven preferably by the same stepping motor, and rotated synchronously with one another.

A path switching part 17 is a conveyance route switching device arranged to select any of the single-sided and double-sided paths, and arranged at the branch point C1 between the conveyance routes. The path switching part 17 preferably includes a claw-shaped rotating member 17a and an unillustrated solenoid, and the solenoid rotationally moves the rotating member 17a to thereby switch between the conveyance paths B2 and B5. That is, in the case where the double-sided path is selected, a document A having arrived at the branch point C1 is conveyed to the conveyance path B2, whereas in the case where the single-sided path is selected, the document A is conveyed to the conveyance path B5.

Assuming that lower and upper surfaces of the document A contained in the paper feed tray 11 are respectively referred to as first and second surfaces, in the case of the double-sided path, the document A is read twice in the order of the first and second surfaces, whereas in the case of the single-sided path, only the second surface of the document A is read. That is, in the case where the double-sided path is selected, the document A is guided to the reading position C2 of the scanner unit 22 by passing sequentially through the conveyance path B1, the branch point C1, and the conveyance path B2, where the first surface thereof is read. Then, the document A is guided again to the reading position C2 through the conveyance path B3, where the second surface thereof is read, and then discharged from the discharge port 18 through the conveyance path B4. On the other hand, in the case where the single-sided path is selected, the document A is guided to the reading position C2 of the scanner unit 22 by passing sequentially through the conveyance path B1, the branch point C1, the conveyance path B5, the merge point C3, and a last half section of the conveyance path B3, where the second surface thereof is read, and then discharged from the discharge port 18 through the conveyance path B4.

The ADF device 10 preferably includes five document detecting sensors DS1 to DS5, for example. The document detecting sensors DS1 and DS2 are provided in the paper feed tray 11 to detect a document A placed on the document stage 13. On the other hand, the document detecting sensors DS3 to DS5 respectively detect arrival or passing of the document A, which is currently conveyed, at different detecting positions. Note that, for each of these document detecting sensors DS1 to DS5, an optical sensor can be used, for example.

The document detecting sensor DS1 is a document placement detector arranged to detect whether a document A is placed on the paper feed tray 11. For example, if a reflective type optical sensor is buried in the document stage 13 near the document stopper 14 to detect the vicinity of the fore end of the document A, the presence or absence of the document A can be determined.

The document detecting sensor DS2 preferably includes two or more document length detectors arranged to detect a length of the document A in the feeding direction, and by arranging the two or more document detecting sensors DS2 so that the positions of the sensors DS2 in the feeding direction are different from each other, the document detecting sensors DS2 detect that the document length is a length within a predetermined range. For example, by burying optical sensors in the document stage 13 posterior to the document detecting sensor DS1, it can be determined whether or not a document length is equal to or more than a predetermined length. In this case, if two or more documents A having different sizes are placed while being stacked, the longest document length is detected.

The document detecting sensors DS3 to DS5 preferably are conveyance state detectors arranged to monitor predetermined detecting positions in the conveyance paths to detect a position of the document A that is currently conveyed, and detect arrival or passing of the document A with respect to the detecting positions. That is, when the fore end of the document A is detected, it can be determined that the document A has arrived at a corresponding detecting position, whereas when a rear end of the document A is detected, it can be determined that the document A has passed through the detecting position.

The document detecting sensor DS3 is arranged over the conveyance path B1 that is sandwiched between the separation roller 15b and the branch point C1, and detects the document A that is fed from the paper feed tray 11 to the conveyance path B1 by the document feeding part 15.

The document detecting sensor DS4 is arranged along the conveyance path B2 that is sandwiched between the branch point C1 and the reading position C2. The document detecting sensor DS4 is a sensor arranged to obtain a timing to read the first surface by the scanner unit 22, and arranged at a position through which the fore end of the document A passes just before arriving at the reading position C2.

The document detecting sensor DS5 is arranged along the conveyance path B3 that is sandwiched between the merge point C3 and the reading position C2. The document detecting sensor DS5 is a sensor to obtain a timing to read the second surface by the scanner unit 22, and arranged at a position through which the fore end of the document A passes just before arriving at the reading position C2.

Alternatively, to detect the document A that is currently conveyed, not only the document detecting sensors DS3 to DS5, but the scanner unit 22 can also be used. That is, the scanner unit 22 can be used as a document detecting sensor to detect arrival or passing of the document A with respect to the reading position C2.

FIGS. 3 to 6 are explanatory diagrams illustrating situations for the case of using the ADF device 10 in FIG. 2 to perform continuous reading of two or more double-sided documents A1 to A4. In general, the ADF device 10 simultaneously conveys two or more documents to be thereby able to shorten a reading time per document at the time of continuous reading. In the case of the ADF device 10, the double-sided path intersects with itself, and therefore a plurality of reading systems can be considered, depending on an order in which the double-sided documents A1 to A4 that are sequentially fed pass through the reading position C2. In the present preferred embodiment, it is assumed that any one of a sequential system, a batch system, and an alternate system is selected by a user. Note that, on the basis of a document size detected on the paper feed tray 11 by the document detecting sensor DS2, any of the reading systems may be selected.

FIGS. 3A-3D are explanatory diagrams of the continuous reading based on the sequential system, and conveyance states of the documents A1 and A2 in the conveyance paths B1 to B5 are illustrated in a time series order. In the sequential system, on the conveyance path B3 for U-turn, two or more documents are not simultaneously conveyed, and reading of the subsequent document A2 is started after both sides of the preceding document A1 have been read.

As illustrated in FIGS. 3A-3C, the document A1 having been first fed is conveyed sequentially on the conveyance paths B1 to B3, and passes through the reading position C2 twice. Also, as illustrated in FIGS. 3C and 3D, the subsequent document A2 is fed before the preceding document A1 is discharged to the paper discharge tray 12 such that after the document A1 has passed through the reading position C2 twice, the document A2 arrives at the reading position C2.

The sequential system is a reading system that, before the preceding document A1 is discharged, starts to feed the subsequent document A2 to thereby shorten the reading time per document. The sequential system is applicable if a document length is equal to or less than a length of the conveyance path B3, and therefore suitable for high-speed reading of relatively long documents. However, a very long interval is required between documents, and therefore as compared with the two systems described below, the reading time per document is long.

FIGS. 4A-4D are explanatory diagrams of the double-sided reading based on the batch system, and conveyance states of the documents A1 to A3 on the conveyance paths B1 to B5 are illustrated in a time series order. In the batch system, on the conveyance path B3 for U-turn, two or more document A1 and A2 are simultaneously conveyed without being overlapped, and double-sided reading of a group of these documents is performed as a unit. That is, regarding the preceding documents A1 and A2, after the first surfaces of the documents A1 and A2 have been read, the second surfaces of the documents A1 and A2 are read, and reading of the subsequent document A3 is started after the both sides of the preceding documents A1 and A2 have been read.

As illustrated in FIGS. 4A and 4B, the documents A1 and A2 having been sequentially fed are conveyed sequentially on the conveyance paths B1 to B3, and after the first surfaces of the documents A1 and A2 have been read, they are brought into a state of being simultaneously conveyed on the conveyance path B3. After that, the documents A1 and A2 are conveyed to the conveyance path B4 through the reading position C2, and then the second surfaces of the documents A1 and A2 are read (FIG. 4C). The subsequent documents A3 and A4 are fed before the preceding document A2 is discharged to the paper discharge tray 12 such that after both of the documents A1 and A2 have passed through the reading position C2 twice, the document A3 arrives at the reading position C2.

The batch system is a reading system that collectively performs the double-sided reading of the two or more documents A1 and A2, and before the documents A1 and A2 are both discharged, starts to feed the subsequent document A3 to thereby shorten the reading time per document. The batch system can further shorten the reading time per document as compared with the sequential system; however, it is not applicable unless a document length is equal to or less than ½ of the length of the conveyance path B3.

FIGS. 5A-5D, 6E and 6F are explanatory diagrams of the double-sided reading based on the alternate system, and conveyance states of the documents A1 to A4 on the conveyance paths B1 to B5 are illustrated in a time series order. In the alternate system, on the conveyance path B3 for U-turn, two or more documents A1 and A2 are simultaneously conveyed at an interval, and documents are fed to the reading position C2 alternately from the conveyance paths B2 and B3.

As illustrated in FIGS. 5A-5C, the documents A1 and A2 having been sequentially fed are conveyed sequentially on the conveyance paths B1 to B3, and after the first surfaces of the documents A1 and A2 have been read, they are brought into a state of being simultaneously conveyed on the conveyance path B3. As compared with the batch system in FIGS. 4A-4D, the alternate system is different in that between the documents A1 and A2, an interval of a length of one document or more is formed. That is, in the alternate system, the documents A1 and A2 are sequentially fed at the interval of the length of one document or more.

Figure 5:
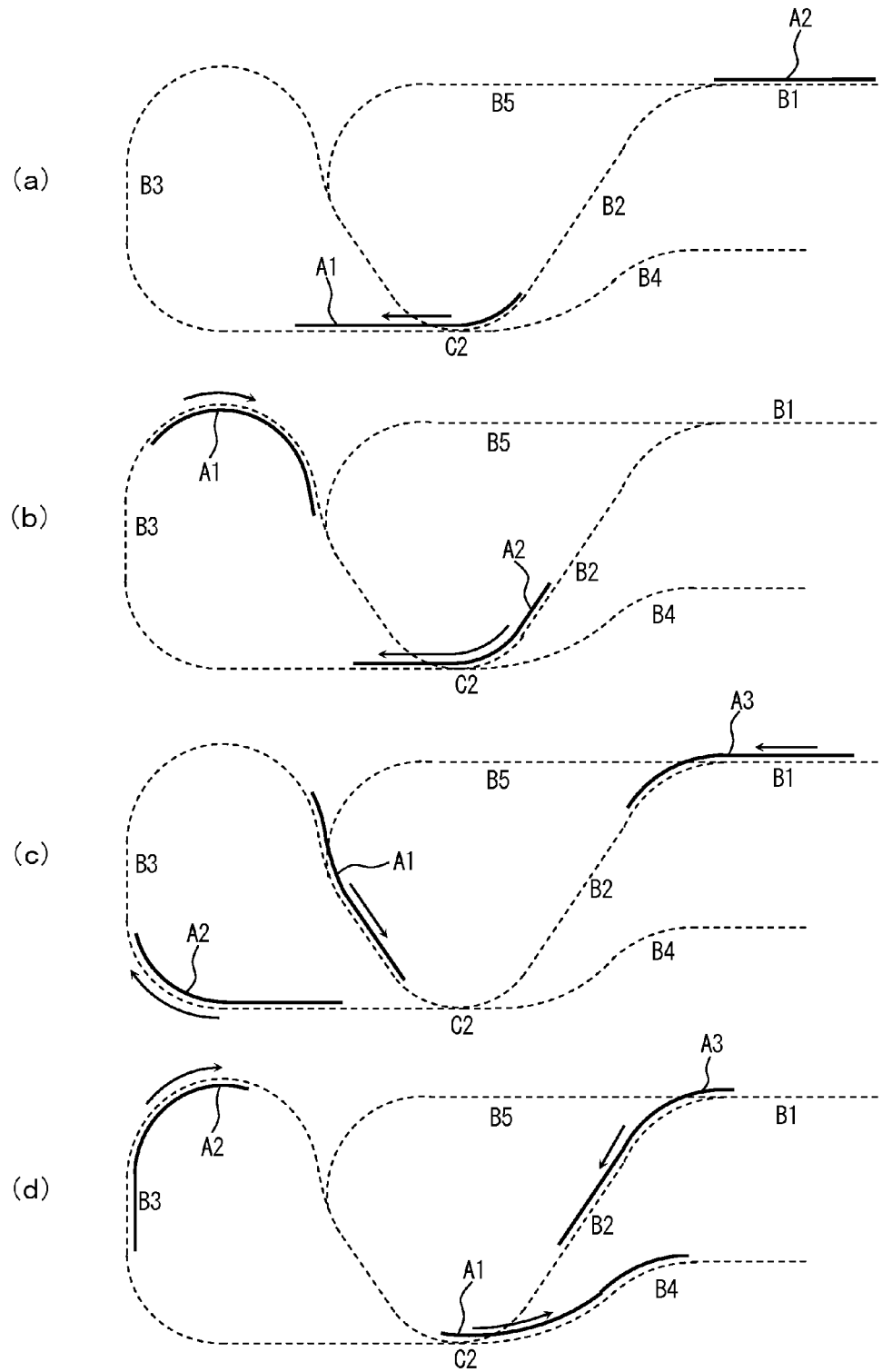
FIGS. 5A-5D are explanatory diagrams of continuous reading based on an alternate system.
Figure 6:
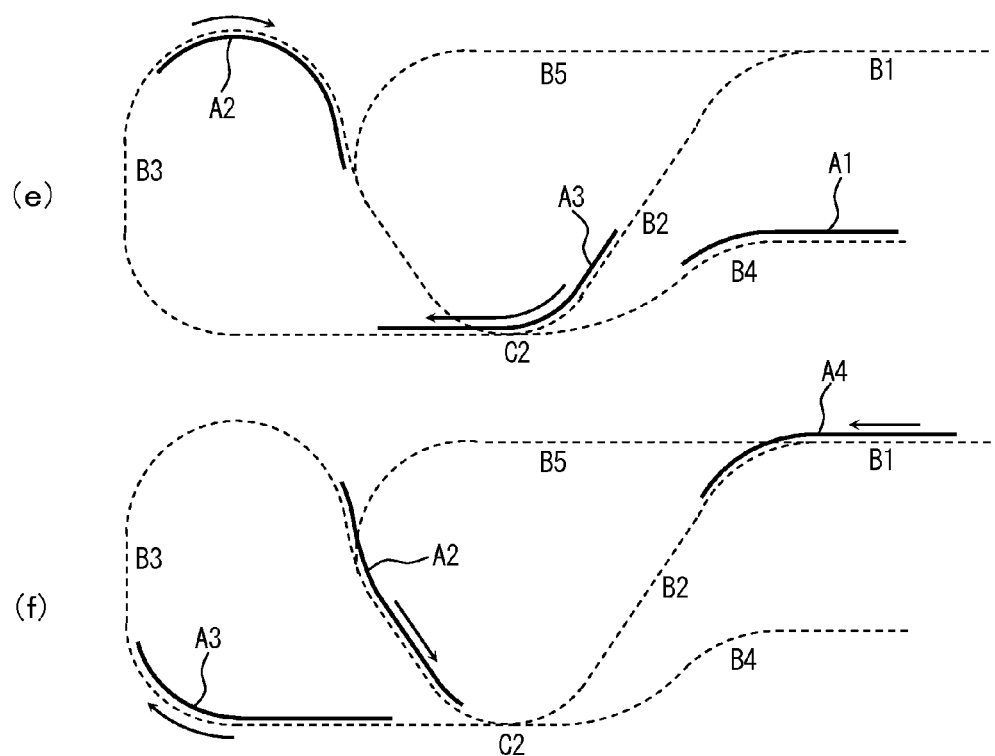
FIGS. 6E and 6F are explanatory diagrams of the continuous reading based on the sequential system.

Then, the document A1 enters the reading position C2 from the conveyance path B3, where the second surface thereof is read (FIG. 5D). When the document A1 is conveyed to the conveyance path B4, the document A3 enters the reading position C2 from the conveyance path B2, where the first surface thereof is read (FIG. 6E). After that, when the document A3 is conveyed to the conveyance path B3, the document A2 enters the reading position C2 from the conveyance path B3, where the second surface thereof is read (FIG. 6F). That is, at the reading position C2, the second surface of the document A1, the first surface of the document A3, and the second surface of the document A2 are sequentially read. FIGS. 5C and 6F illustrate the same state except that the set of documents in FIG. 5C is replaced by the next set of the documents in FIG. 6F, and after the state of FIG. 6F, by sequentially repeating the states of FIG. 5C to FIG. 6E, the continuous reading can be performed.

The alternate system is a reading system that simultaneously conveys two or more documents on the conveyance path B3, and at the reading position C2, alternately reads first and second surfaces, and that shortens the reading time per document. The alternate system can further shorten the reading time per document as compared with the batch system; however, it is not applicable unless a document length is equal to or less than ⅓ of the length of the conveyance path B3.

Note that, in the following, in principle, an example of the case where the continuous reading based on the sequential system is performed is described.

Figure 7:
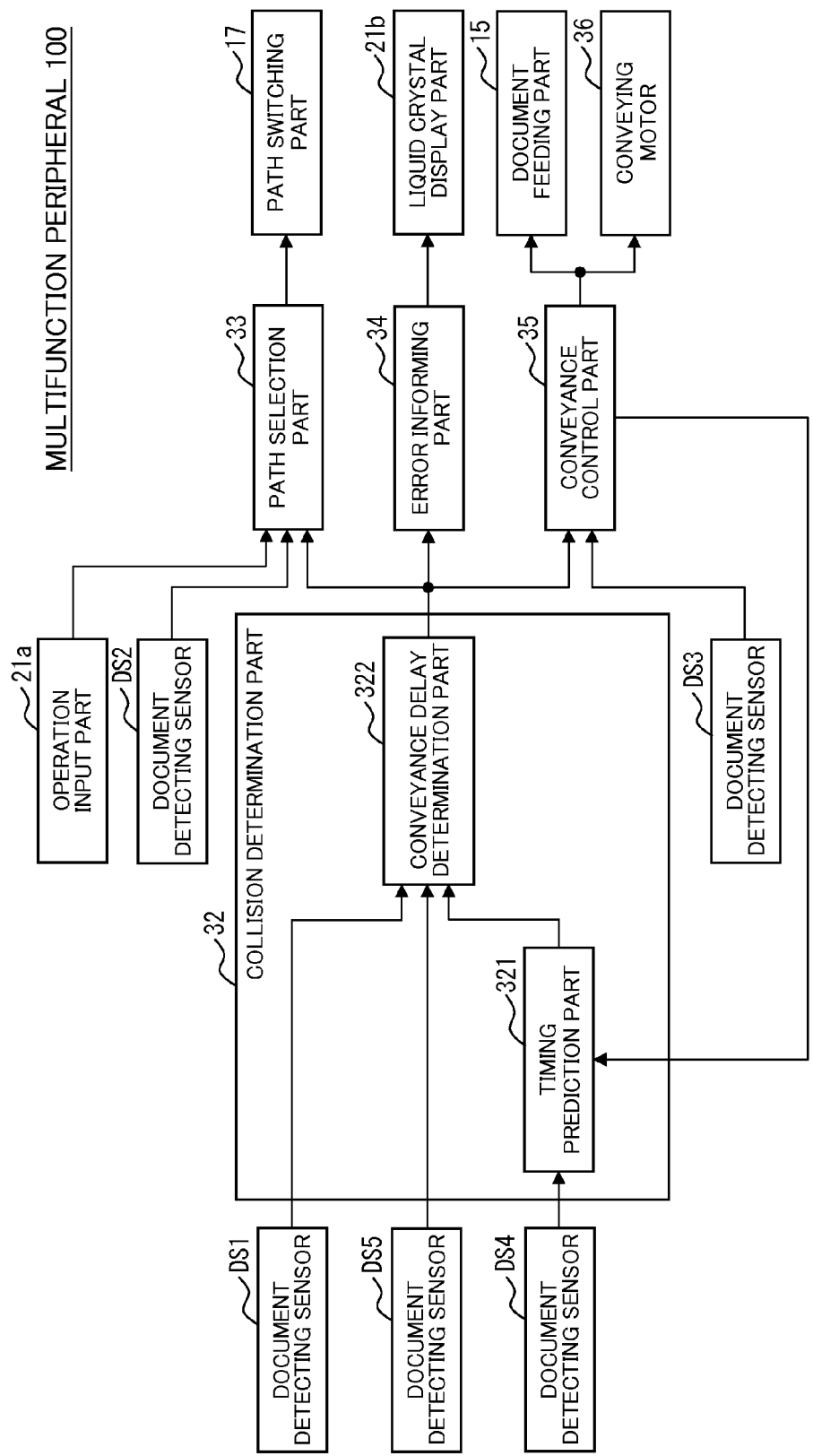
FIG. 7 is a functional block diagram illustrating the configuration example of the main portion of the multifunction peripheral 100 in FIG. 1.

FIG. 7 is a functional block diagram illustrating the configuration example of the main portion of the multifunction peripheral 100 in FIG. 1. The multifunction peripheral 100 is provided with a collision determination part 32, a path selection part 33, an error informing part 34, a conveyance control part 35, and a conveying motor 36.

The collision determination part 32 includes a timing prediction part 321 and a conveyance delay determination part 322, and on the basis of detection results of a document A by the two document detecting sensors DS4 and DS5, determines a possibility of a collision between documents. If conveyance delay occurs in a preceding document A1 due to slip of any of the conveyance rollers 16, in the vicinity of the reading position C2 where the double-sided path intersects with itself, the document A1 may collide head-on with a subsequent document A2. Accordingly, if a delay time td of the preceding document is obtained, the collision between the documents can be predicted.

The timing prediction part 321 predicts, on the basis of detection timing of the preceding document by the upstream side document detecting sensor DS4, detection timing of the document A1 by the downstream side document detecting sensor DS5. A conveyance time between the document detecting sensors D4 and D5 can be obtained on the basis of a rotating speed of the conveyance rollers 16. Accordingly, the timing prediction part 321 obtains the conveyance time on the basis of a drive signal from the conveyance control part 35 to thereby predict the detection timing by the document detecting sensor DS5 from the detection timing by the document detecting sensor DS4.

If the conveyance delay of the preceding document A1 exceeds a predetermined allowable value, the conveyance delay determination part 322 determines that the preceding document A1 may collide with the document A2, and then generates a collision determination signal. The delay time td of the document A1 can be obtained by comparing the detection timing predicted by the timing prediction part 321 and actual detection timing with each other. If the delay time td exceeds the predetermined allowable time ta, the conveyance delay determination part 322 generates the collision determination signal. That is, if the allowable time ta has further passed since the predicted detection timing without the detection of the document A1 by the document detecting sensor DS5, the collision determination signal is immediately generated without waiting for the detection of the document A1 by the document detecting sensor DS5.

In this manner, the detection results by the document detecting sensors DS4 and DS5 to obtain a reading timing are used to obtain the delay time td of the document A1 in a conveyance section from the document detecting sensor DS4 to DS5. For this reason, without newly adding a sensor, the collision determination can be performed.

In addition, if the subsequent document A2 is not present, the collision between the documents does not occur, and therefore only in the case where the subsequent document A2 is present, the conveyance delay determination part 322 is required to generate the collision determination signal. The presence of the subsequent document A2 can be determined on the basis of a detection result by the document detecting sensor DS1 or DS3.

Also, the document detection timing, conveyance time, allowable time ta, and the like are expressed as count values of a clock signal inside the multifunction peripheral 100, and can be measured by counting the clock signal. In this case, depending on a driving speed of the conveying motor 36, the conveyance time and allowable time ta should be adjusted.

The path selection part 33 selects any of the double-sided and single sided paths as a document conveyance route on the basis of a user's operation that specifies the double-sided or single-sided reading. At this time, on the basis of a detection result by the document detecting sensor DS2, a document length is determined. If the document length is longer than the length of the conveyance path B3, the user cannot specify the double-sided reading. The path switching part 17 switches the conveyance route on the basis of a result of the selection. When the user operates the operation input part 21a of the operation panel 21 to specify the double-sided reading, the pass selection part 33 selects the double-sided path, and thereby a document is conveyed from the branch point C1 to the conveyance path B2. On the other hand, when the user specifies the single-sided reading, the pass selection part 33 selects the single-sided path, and thereby the document is conveyed from the branch point C1 to the conveyance path B5.

Also, the path selection part 33 selects the double-sided or single-sided path on the basis of a determination result by the collision determination part 32. Specifically, if during performing the double-sided reading of a preceding document A1, the collision determination part 32 determines that a collision between documents may occur, the path selection part 33 changes from the double-sided path to the single-sided path, and sends a subsequent document A2 to the conveyance path B5 to prevent the collision between the documents in the vicinity of the reading position C2.

The error informing part 34 provides the error display on the liquid crystal display 21b of the operation panel 21 on the basis of a determination result by the collision determination part 32. If the collision determination part 32 determines that a collision between documents may occur, document reading is stopped, and therefore the error informing part 34 informs a user of the error.

The conveyance control part 35 controls the document feeding part 15 and the conveying motor 36 to control feeding of documents and a conveying speed. If a document A2 is present on the paper feed tray 11, the document feeding part 15 generates a feeding signal after a predetermined time has passed since a preceding document A1 was fed. On the basis of the feeding signal, the document feeding part 15 feeds the document A2. Also, the conveyance control part 35 generates a motor driving signal to control driving of the conveying motor 36. The conveying motor 36 preferably is a stepping motor of which a rotating shaft is connected with the respective conveying rollers 16, and the respective conveying rollers 16 are rotated synchronously with one another by driving force of the conveying motor 36. That is, the conveying speed of a document is controlled by the conveyance control part 35.

Also, the conveyance control part 35 controls feeding of documents and the conveying speed on the basis of a determination result by the collision determination part 32. That is, if the collision determination part 32 determines that a collision between documents may occur, the conveyance control part 35 stops feeding of documents by the document feeding part 15, and also stops rotation of the conveying motor 36. However, if the conveying speed of a document is rapidly changed, the document may be damaged, such as distortion of the document. For this reason, the conveyance control part 32 gradually reduces the rotating speed of the conveying motor 36 to stop the document.

In this manner, if a collision between documents that are currently subjected to the double-sided reading may occur, the path selection part 33 switches the conveyance route for a subsequent document A2 to the single-sided path to thereby prevent the documents from colliding head-on with each other in the vicinity of the reading position C2. For this reason, conveyance of the documents can be moderately stopped to prevent the documents from colliding head-on with each other with little or no damage to the documents. Note that, in the case of moderately stopping the conveyance, the documents may come into contact with each other in the vicinity of the merge point C3; however, even if the documents that are currently conveyed in the same direction come into contact with each other, a so-called multiple feeding state simply appears, and therefore the documents are not significantly damaged.

Also, if at the time when the collision determination part 32 determines that a collision may occur, the fore end of the subsequent document A2 has already passed through the branch point C1, the document A2 cannot be sent to the conveyance path B5. For this reason, if the conveyance control part 35 determines on the basis of a detection result by the document detecting sensor DS3 that conveyance route switching by the path switching part 17 is not in time, it rapidly stops the conveying motor to prevent a head-on collision in the vicinity of the reading position C2.

Figure 8:
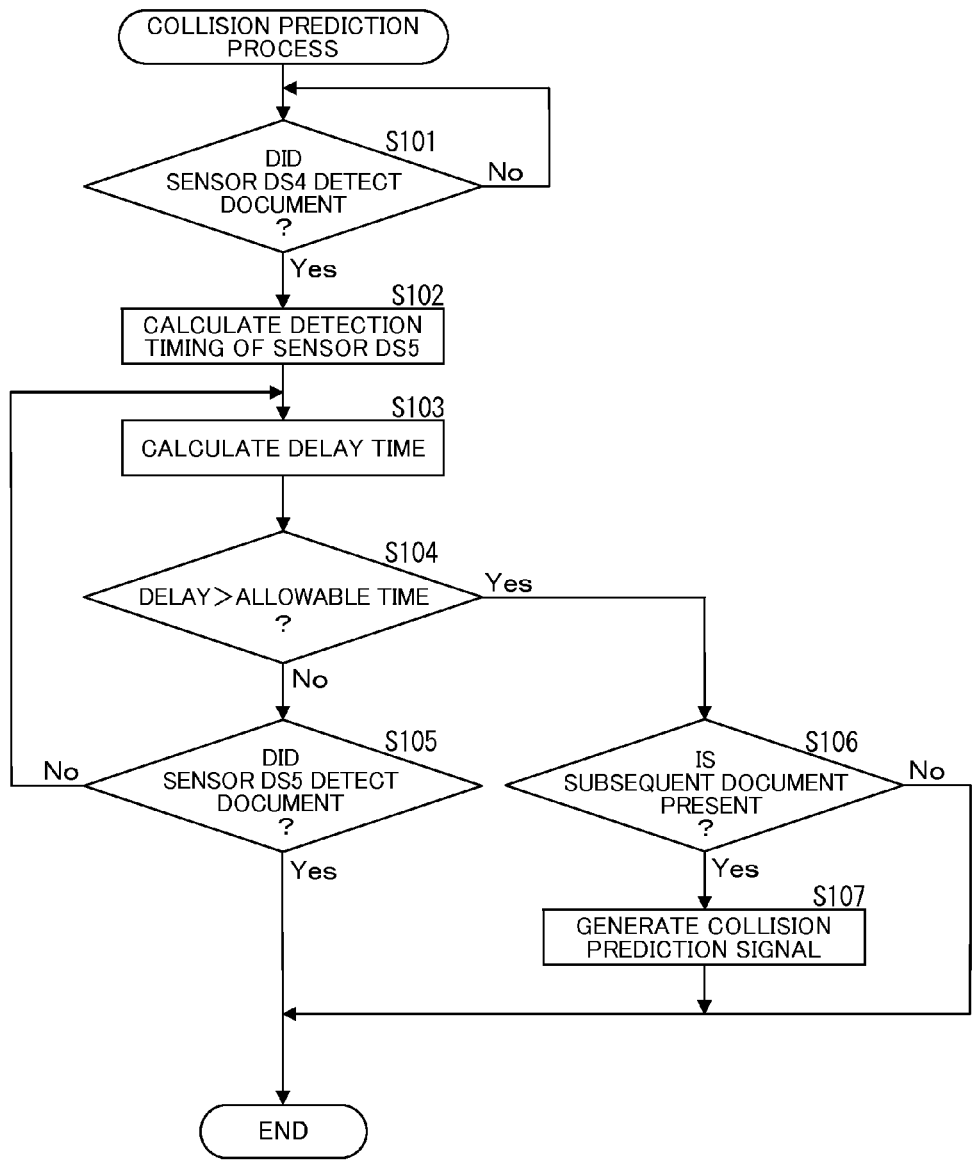
FIG. 8 is a flowchart illustrating one example of a collision determination process by the collision determination part 32 in FIG. 7.

Steps S101 to S107 in FIG. 8 represent a flowchart illustrating one example of a collision determination process performed by the collision determination part 32 in FIG. 7. First, a document A1 that is currently conveyed through the double-sided path is detected by the document detecting sensor DS4 (Step S101). On the basis of a signal of the detection, the timing prediction part 321 obtains a timing for the document detecting sensor DS5 to detect the document A1 (Step S102). The detection timing is obtained in consideration of the rotating speed of the conveying motor 36.

Then, until the document A1 is detected by the document detecting sensor DS5, the conveyance delay determination part 322 repeatedly performs a calculation of a delay time td of the document A1 and a comparison between the delay time td and the allowable time to (Steps S103 to S105). That is, if the document A1 is detected on the predicted detection timing by the document detecting sensor DS5, the conveyance delay determination part 322 determines that a collision does not occur, and terminates the collision determination process (Step S105). On the other hand, if the document detecting sensor DS5 cannot detect the document A1 by the predicted detection timing, an excess time from the detection timing is obtained as the delay time td (Step S103). The delay time td is compared with the allowable time ta (Step S104).

In step S104, if the delay time td exceeds the allowable time ta, it is determined whether or not the subsequent document A2 is present (Step S106). The presence of the subsequent document A2 can be determined by the sensor DS1 or DS3. As a result, if the subsequent document A2 is present, the conveyance delay determination part 322 determines that the documents A1 and A2 may collide with each other, and then generates the collision determination signal (Step S107).

Figure 9:
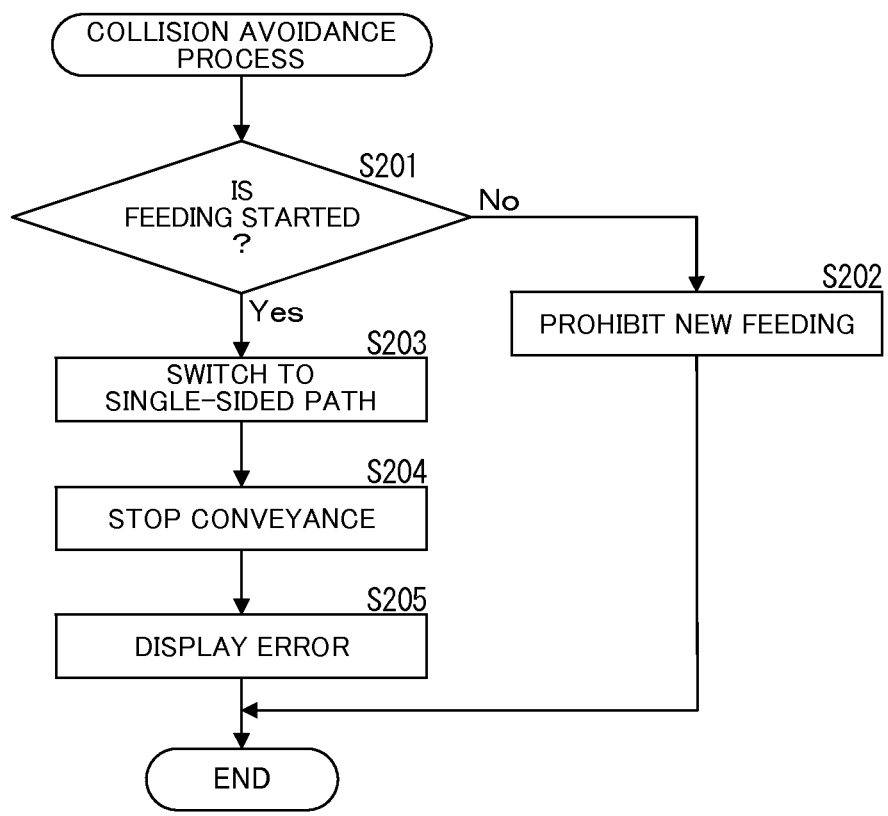
FIG. 9 is a flowchart illustrating one example of a collision avoidance process.

Steps S201 to S205 in FIG. 9 represent a flowchart illustrating one example of a collision avoidance process. The collision avoidance process is started if it is determined that a preceding document A1 that is currently subjected to the double-sided reading may collide with a subsequent document A2, and the collision determination signal is outputted from the collision determination part 32.

First, if feeding of the subsequent document A2 is not started, subsequent feeding processing is prohibited (Steps S201 and S202). If the subsequent document A2 is not fed onto the conveyance path, no collision occurs between the documents. For this reason, if the feeding of the document A2 is not started, the new feeding processing is prohibited to terminate the collision avoidance process.

If the feeding of the document A2 has been started, the path switching part 17 switches the conveyance route from the double-sided path to the single-sided path (Step S203). At this time, if the fore end of the document A2 has not arrived at the branch point C1, the document A2 is sent to the conveyance path B5, and thereby the document A2 can be prevented from colliding head-on with the preceding document A1 in the vicinity of the reading position C2. The document A2 then arrives at the merge point C3, where the document A2 may interfere with the document A1; however, these documents A1 and A2 are both conveyed in the same direction, and therefore are not significantly damaged.

Also, if the feeding of the subsequent document A2 has been started, the conveying motor 36 is stopped (Step S204). At this time, the conveyance control part 35 gradually reduces the rotating speed of the conveying motor 36 to moderately stop the conveying motor 36. By performing such control, the conveyance can be stopped without damage to the documents A1 and A2 that are currently conveyed.

Finally, error output is provided to a user (Step S205). A situation that conveyance delay of the document A1 has been detected, and an emergency stop of document conveyance has been performed is displayed on the liquid crystal display 21b to terminate the collision avoidance process.

Note that in the case where, when the conveyance route is switched in Step S203, the fore end of the document A2 has already arrived at the branch point C1, even if the claw-shaped rotating member 17a is rotated, the conveyance path for the document A2 cannot be changed, and the document is sent to the conveyance path B2. In this case, a preferred embodiment of the present invention can also be configured such that the conveyance control part 35 quickly stops the conveying motor 36 to prevent the collision between the documents. A position of the fore end of the document A2 in any of the conveyance paths can be determined on the basis of, for example, an elapsed time after the fore end of the document A2 was detected by the document detecting sensor DS3.

In the image reader according to the present preferred embodiment of the present invention, the document detecting sensors DS4 and DS5 over the double-sided path preferably are used to detect the delay time td of the document A1 that is currently subjected to the double-sided reading. If the delay time td exceeds the allowable time ta, it is determined that the document A1 will collide with the subsequent document A2, and the path switching part 17 switches from the double-sided path to the single-sided path. For this reason, in the vicinity of the reading position C2 where the double-sided path intersects with itself, the documents A1 and A2 can be prevented from colliding head-on with each other to be significantly damaged.

Note that, in the present preferred embodiment, an example of the case of, at the time of continuous reading based on the sequential system, avoiding the preceding document A1 and the subsequent document A2 from colliding with each other in the vicinity of the reading position C2 is described; however, the present invention is not limited to such a case. That is, the present invention can also be applied to the case of, at the time of continuous reading based on the batch or alternate system, preventing documents from colliding with each other in the vicinity of the reading position C2. The present invention can also be applied to the case where, for example, in the case of the alternate system in which two documents A1 and A2 that have sequentially been fed are simultaneously conveyed on the conveyance path B3, on the basis of conveyance delay of the document A1, a possibility of a collision between the document A1 and a document A3 that has been fed after the document A2 is determined to prevent the collision between the documents.

Also, in the present preferred embodiment, an example of the case of measuring the conveyance time of the document A1 as the count value of the clock signal is described; however, the present invention is not limited to such a case. For example, by detecting a rotation amount of the conveying motor 36 instead of the count value of the clock signal, a conveyance distance of the document A1 is obtained instead of the conveyance time, and a displacement of a document position can also be obtained instead of the delay time. The document position displacement is compared with a predetermined allowable value, and if the displacement exceeds the allowable value, it can be determined that a collision may occur. The rotation amount of the conveying motor 36 can be obtained on the basis of the motor driving signal outputted from the conveyance control part 35. In particular, in the case of using the stepping motor as the conveying motor 36, the conveyance distance of the document A1 can be obtained as the number of steps of the conveying motor 36, and therefore the document position displacement can be accurately detected to accurately determine the collision possibility.

Further, in the present preferred embodiment, an example of the case of using the document detecting sensors DS4 and DS5 to obtain the reading timing at the reading position C2 to make the collision determination is described; however, the present invention is not limited to such a case. That is, with the use of any two of the document detecting sensors DS3 to DS5 and the scanner unit 22 that can detect the document A1 that is currently conveyed, or with the use of another document detecting sensor, the collision determination can be made. For example, a timing to pass through the reading position C2 for the first time is detected by the scanner unit 22 instead of the document detecting sensor DS4, and on the basis of a conveyance time from the reading position C2 to the document detecting sensor DS5, the collision determination can also be made. Also, a timing to pass through the reading position C2 for the second time is detected by the scanner unit 22 instead of the document detecting sensor DS5, and on the basis of a conveyance time from the document detecting sensor DS5 to the reading position C2, the collision determination can also be performed.

Also, the document detecting sensors DS4 and DS5 may be ones that detect any of the fore and rear ends of the document A1 that is currently conveyed, or ones that detect the both.

Further, in the present preferred embodiment, an example of the case where the respective conveying rollers 16 are driven by the one conveying motor 36 and rotated synchronously with one another is described; however, the present invention is not limited to such a case. For example, the present invention may be configured such that, with use of different conveying motors, or with use of a clutch mechanism or the like, some of the conveying rollers 16 are rotated or stopped asynchronously with the rest of the conveying motors 16.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image reader comprising:
 a reading specifying device arranged to specify one of a double-sided reading and a single-sided reading as a reading method for a document;
 a route switching device arranged to, at a branch point between a first conveyance route for the double-sided reading and a second conveyance route for the single-sided reading, on a basis of the reading method specified by the reading specifying device, switch a document conveyance route; and
 a collision determination device adapted to determine a possibility of a collision between documents; wherein
 the first conveyance route includes:
 a first introduction path that conveys the document from the branch point to a reading position;
 a U-turn path that causes the document to make a U-turn, the document having entered from the first introduction path and passed through the reading position, and that causes the document to enter the reading position again from a direction opposite to the first introduction path; and
 a discharge path that conveys the document to a paper discharge tray, the document having entered from the U-turn path and passed through the reading position; and
 the second conveyance route includes:
 a second introduction path that, without passing through the reading position, conveys the document from the branch point to a merge point in the U-turn path; and
 upon the double-sided reading being specified, the route switching device switches the document conveyance route from the first conveyance route to the second conveyance route on a basis of a result of the determination by the collision determination device.

2. The image reader according to claim 1, further comprising a document detecting sensor that detects the document on the first conveyance route, wherein the collision determination device determines a possibility of a collision between documents on a basis of a detection result by the document detecting sensor.

3. The image reader according to claim 2, further comprising first and second document detecting sensors to detect the document on the first conveyance route, wherein when the document having passed through the first document detecting sensor does not pass through the second document detecting sensor within a subsequent predetermined time, the collision determination device determines that the documents may collide with each other.

4. The image reader according to claim 1, further comprising:
 a document detecting sensor that detects the document on the first conveyance route; and
 a conveying motor that conveys the document; wherein
 the collision determination device determines a possibility of a collision between documents on a basis of a detection result by the document detecting sensor and a rotation amount of the conveying motor.

* * * * *